United States Patent [19]
Barnett et al.

[11] 3,939,891
[45] Feb. 24, 1976

[54] NON-SKID DEVICE FOR VEHICLE WHEELS

[76] Inventors: Forest H. Barnett, 2602 N. Baltimore, Tacoma, Wash. 98407; Clarence E. Barnett, 5208 156th NE., Redmond, Wash. 98052

[22] Filed: Oct. 18, 1974

[21] Appl. No.: 516,038

[52] U.S. Cl............ 152/225 R; 152/180; 152/221
[51] Int. Cl.²........................................ B60C 27/20
[58] Field of Search............ 152/221, 222, 217–219, 152/225, 231, 239, 167, 170, 173, 178, 180

[56] References Cited
UNITED STATES PATENTS

| | | | |
|---|---|---|---|
| 1,020,489 | 3/1912 | Gaylor | 152/225 |
| 1,332,362 | 3/1920 | Schwartz | 152/221 |
| 1,342,753 | 6/1920 | McGeorge | 152/221 |
| 2,341,316 | 2/1944 | Ederer | 152/221 |
| 2,540,230 | 2/1951 | Andrews | 152/222 |
| 3,464,475 | 9/1969 | Freed | 152/167 |
| 3,476,167 | 11/1969 | Kitsopoulos | 152/225 R |

*Primary Examiner*—Drayton E. Hoffman

[57] ABSTRACT

A non-skid device in which the road engaging part is a long flexible member formed of one or more twisted steel wire cables embedded in a thick coating of rubber and in which said road engaging part, when on a tire, extends back and forth zigzag fashion diagonally across the tread of the tire and is secured in place on the tire by two belt type anchor members which are positioned respectively at opposite sides of the tire. The anchor member at the inner side of the tire has readily detachable parts which, when detached, allow the non-skid member to be applied to a tire from the outer side of the wheel without using a jack to lift the wheel. Means is provided for tightening the non-skid device on a tire after it is applied thereto. The flexible zigzag road engaging parts have good non-skid qualities and have longer life than metal cross chains when used on bare pavements.

9 Claims, 17 Drawing Figures

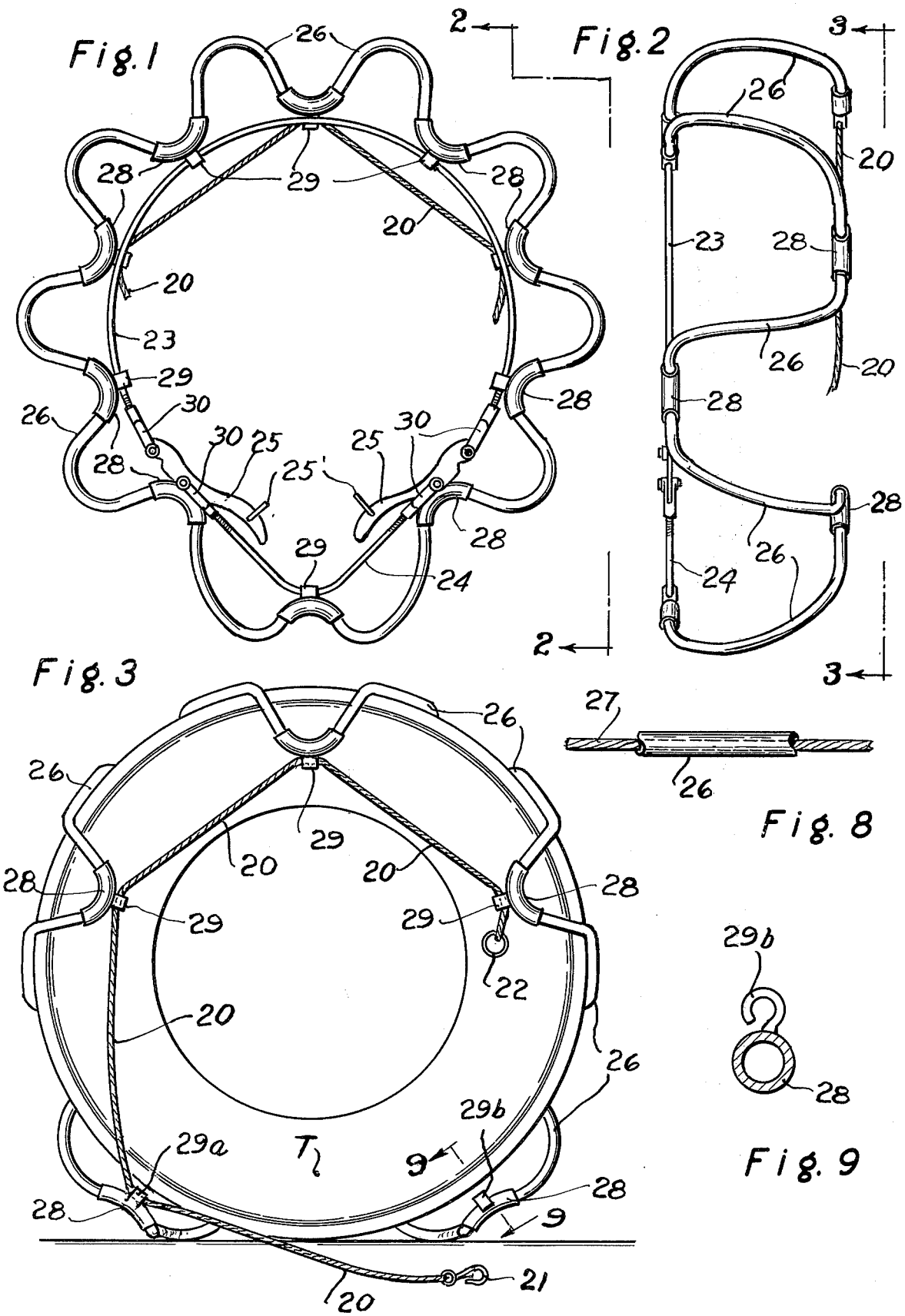

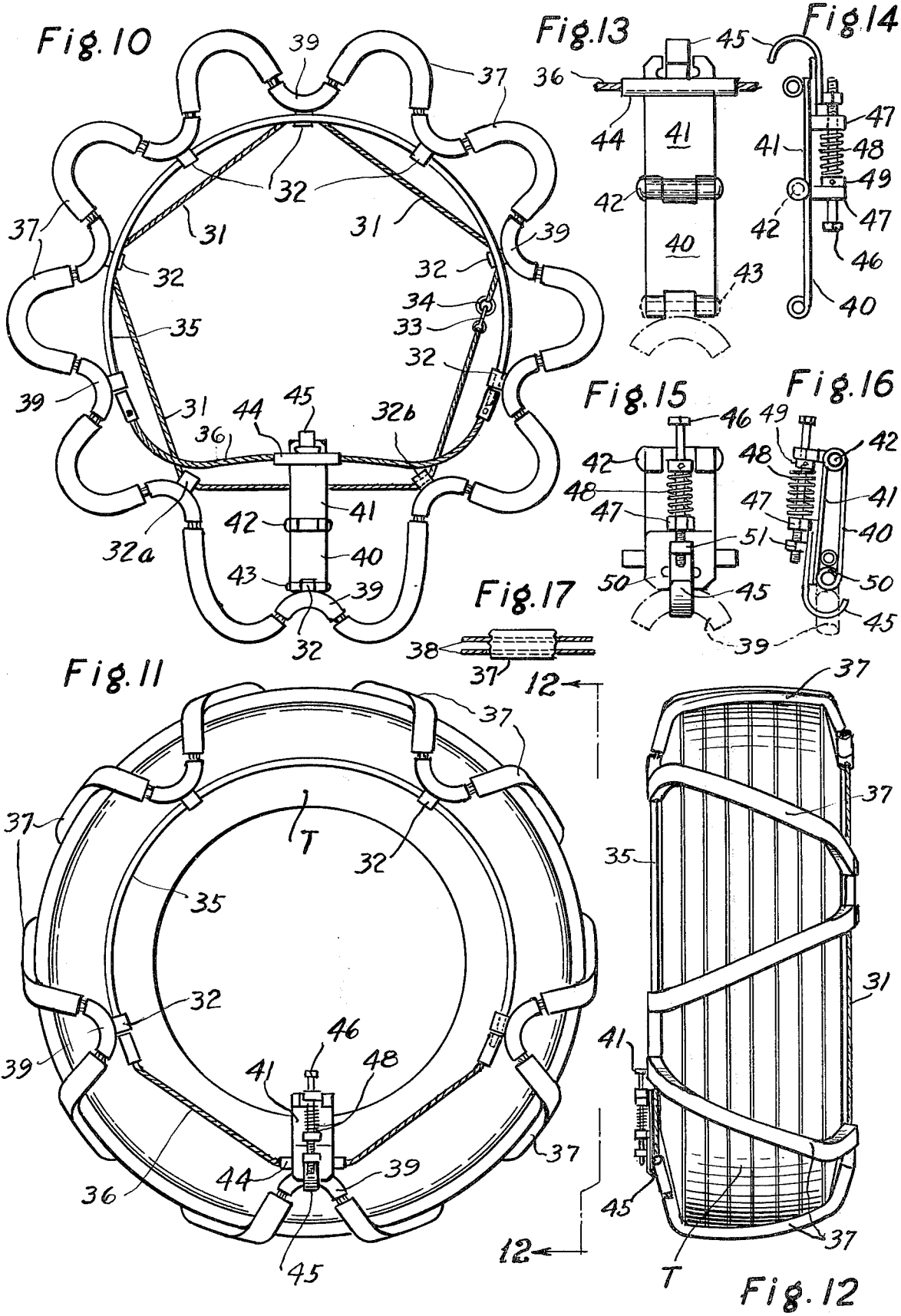

NON-SKID DEVICE FOR VEHICLE WHEELS

SUMMARY OF THE INVENTION

A general object of this invention is to improve non-skid devices of the type commonly known as the tire chaim to make these devices quicker and easier to apply to and remove from a tire and to make them more durable and capable of withstanding more miles of service, especially when they are being used on paved roads that are partly or entirely bare of snow and ice.

Another object is to provide a non-skid device in which the skid resisting part that contacts or engages with the road is a relatively long flexible strip formed of one or more twisted steel wire cables embedded in a thick coating of flexible material, such as strong and durable tread rubber or plastic, said coating being either continuous or interrupted, and in which said road engaging strip is positioned and arranged so that, when the nonskid device is on a tire, said strip extends in zigzag fashion, diagonnaly, back and forth across the tread portion of the tire and is secured on the tire by two belt or loop type anchor members that are connected with it and are positioned respectively against the inner and outer sides of the tire.

A further object is to provide a non-skid device of this type having an inside anchor member that is provided with readily detachable connector means which, when disconnected makes it possible to apply the non-skid device to a tire from the outer side of a wheel without jacking up the wheel.

Another object is to provide quickly and easily operable means for tightening the non-skid device on a tire after it has been correctly positioned on the tire.

Other objects of the invention will be apparent from the following description and accompanying drawings.

BRIEF DESCRIPTION OF THE DRAWINGS

FIG. 1 is an outside elevational view of this device showing the same substantially as it would appear if it were opened up or expanded to the shape it would assume when applied to a tire and before it had been tightened thereon.

FIG. 2 is an edge view of the same, looking in the direction indicated by line 2 — 2 of FIG. 1. FIG. 3 is an elevational view showing the inner side of a tire with this non-skid device supported on the tire in approximately the position it would occupy. After being placed on the tire and before being fastened and tightened thereon.

FIG. 8 is a fragmentary detail view showing the construction of a flexible ground engaging part of the device.

FIG. 9 is a detached side view showing a preferred type of hook used to connect parts of the device.

FIG. 10 is an outside view of a modified form of this non-skid device showing the same as it might appear if it were expanded to the shape it would assume if it were on a tire and before it had been tightened on said tire.

FIG. 11 is an outer side elevation showing the device of FIG. 10 on a tire and tightened thereon.

FIG. 12 is an edge view looking in the direction indicated by line 12 — 12 of FIG. 11.

FIG. 13 is a detached plan view of a fastening device showing the same in a wide open position.

FIG. 14 is an edge view of said fastening device showing it open.

FIG. 15 is a plan view of said fastening device showing it closed.

FIG. 16 is an edge view of said fastening device showing it closed.

FIG. 17 is a plan view showing a fragment of a skid resisting member. Like reference numerals refer to like parts throughout the drawings.

DESCRIPTION OF THE PREFERRED EMBODIMENT

In a general way this non-skid device comprises two endless belt or loop type side parts which, when they are applied to a tire on a wheel and properly fastened, lie close to the side walls of the tire and form two endless loops of smaller size than the tread of the tire and serve as anchor members to which a road engaging part of the non-skid device is secured. This road engaging part is flexible and of strip form and when the non-skid device is on a tire it extends in zigzag fashion diagonally back and forth across the tread portion of the tire.

Figure 4:
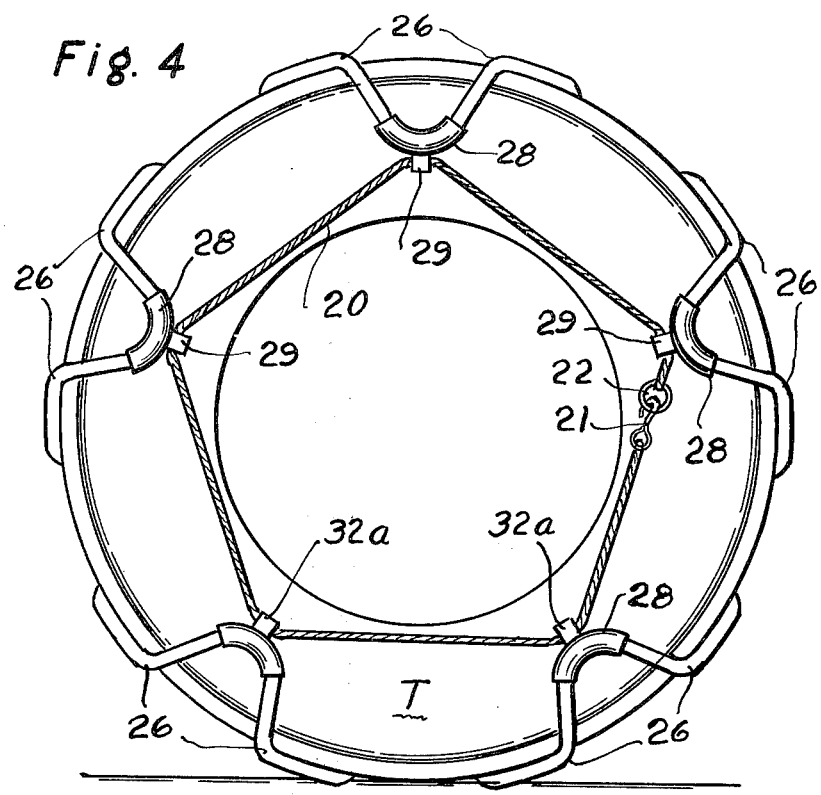
FIG. 4 is an inside elevational view similar to FIG. 3 except that all parts of this non-skid device have been fastened and its application to the tire completed.

The structure of the anchor parts used at the sides of the tire can be varied. As herein shown the inner anchor part, see FIGS. 1, 3 and 4, is formed of a flexible cable 20, preferably of twisted steel wire, having a snap type fastener 21 attached to one end and an eye member 22 attached to its other end for readily releasable engagement by said snap type fastener 21 when the two ends of cable 20 are secured together it forms a closed anchor loop at the inner side of the tire.

Figure 5:
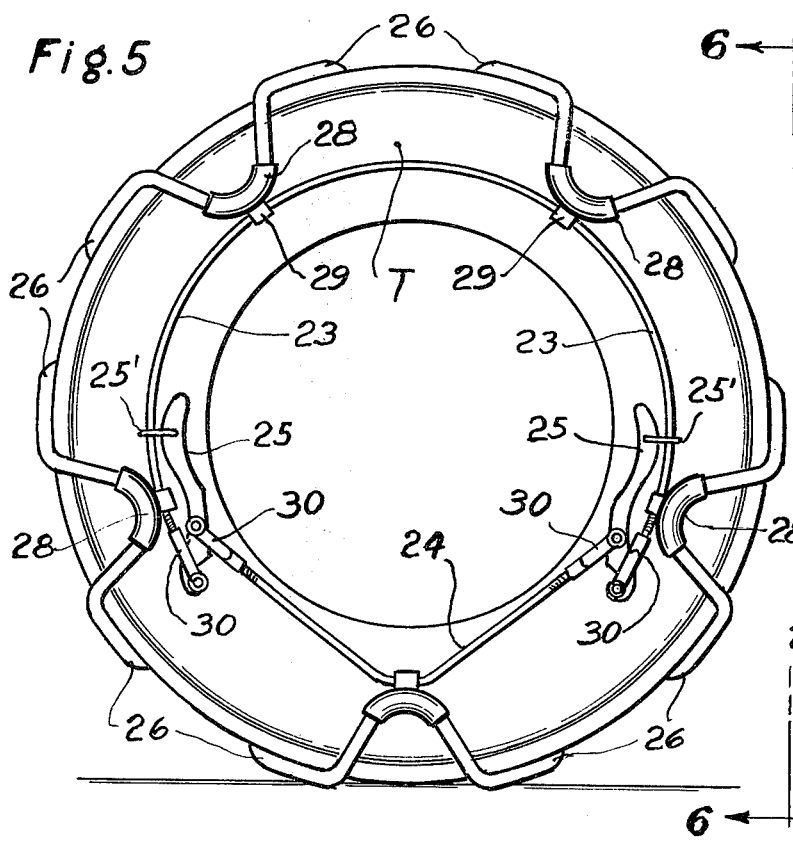
FIG. 5 is a side elevational view showing the outer side of a tire with the non-skid device installed and fastened on it.
Figure 6:
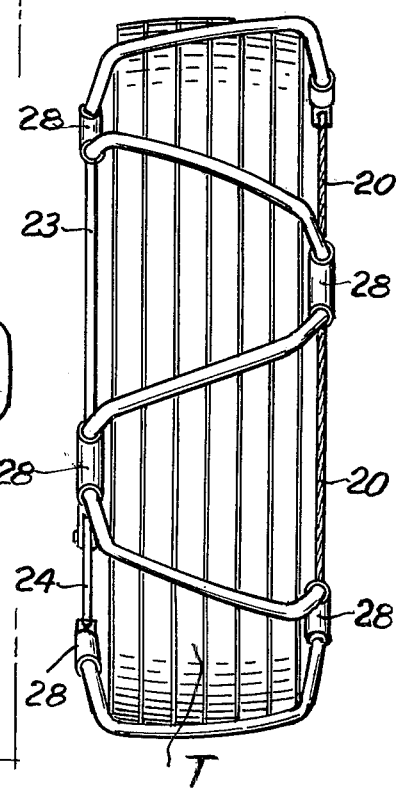
FIG. 6 is an edge view looking in the direction indicated by line 6 — 6 of FIG. 5.

The outer side part, FIGS. 1 and 5, comprises two frame members 23 and 24 which cooperate to form a closed anchor loop. The member 23 is preferably an arcuate metal rod or the like about three fifths of a circle in extent. Member 24 is shown to be a metal rod but can be a flexible steel wire cable. It spans the gap between the two ends of member 23.

Figure 7:
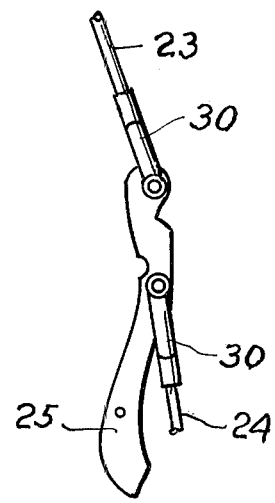
FIG. 7 is a detached side elevational view showing a lever type take-up or tensioning device used in an outer side anchor member.

Two take-up devices, one of which is shown detached FIG. 7, and each of which comprises a lever 25 and two devises 30, connect the respective ends of frame member 23 with the adjacent ends of frame member 24. Levers 25 serve as leverage means by which the circumferential length of the outside anchor member, formed by parts 23, 24, 25 and 30, can be varied to tighten or slacken the non-skid device on a tire. A hook 25' or similar readily releasable fastening device is provided to secure each lever 25 in tensioning position in which levers 25 are shown in FIG. 5.

The road or ground engaging part of the non-skid device shown in FIGS. 1 to 9 is a strong, flexible strip type member of round cross section formed of a fairly thick outer part 26, FIG. 8, of tough, durable, tread rubber molded or otherwise rigidly secured on a core part 27 in the form of a strong cable, preferably of twisted steel wire.

A plurality of curved metal tubes 28, which form parts of connector member by which the road engaging part of the device is connected with the inside and outside anchor parts, are provided at equally spaced intervals on the road engaging member 26 and preferably are secured to member 26 so they are not liable to move thereon. The two ends of said road engaging member, and particularly the two ends of cable part 27 thereof, are permanently secured together.

A lug 29 is rigidly attached to and protrudes from the convex side of each tube 28 on the outer side of the non-skid of the device. Three similar lugs, also numbered 29, and a fourth lug numbered 29a and a hook numbered 29b are respectively rigid with and protrude from the convex sides of the five tubes 28 on the inner side of the non-skid device.

Because of the zigzag arrangement of the road engaging member 26 the member can be a strip type endless member and it has circumferentially offset points of connection with the inner and outer anchor members.

The outside anchor parts 23 and 24 pass through the lugs 29 at the outer side of the non-skid device and are rigidly secured to them. The inside anchor cable 20 passes through and is rigidly secured to the three lugs 29 at the inner side, is slidable in the fourth lug 29a and is adapted to be detachably engaged with the hook 29b.

When the end portion of the cable 20 is left free by disengaging its two ends and releasing it from hook 29b one side of a V-shaped area between two skid resisting parts of member 26 is left unobstructed by said member 20 and the two divergent skid resisting parts can be pushed under the tire from the outer side of the wheel, one at each side of the flattened part of the tire which rests on the road, to a position where the cable fasteners 21, 22 and 29b can be made fast by reaching inside of the tire. This allows the non-skid device to be applied without jacking up the wheel.

The hook 29b is positioned to be engaged with the inside anchor member 20 at the location closest to the detachable end of said member 20 to which the snap type fastening device 21 is secured. Said member 20 is slidably held in the next adjacent perforated lug 29a.

The non-skid device shown in FIGS. 10 to 17 has an inside anchor member or part which is substantially a duplicate of the inside anchor member or part shown in FIGS. 1 to 9. It comprises a cable 31 connected by perforated lugs 32 and 32a and a hook 32b with the inner edge portion of a road engaging part hereinafter described. The cable 31 has two ends provided respectively with a snap type fastener 33 and an eye member 34.

The outside anchor member shown in FIGS. 10 to 17 comprises a frame part 35 similar to previously described frame part 23 and a flexible wire cable part 26 which functions similarly to previously described part 24. Obviously frame part 35 can be a flexible wire cable. The cable 36 is connected with a tightening device hereinafter described.

The road contacting part of the device shown in FIGS. group 10 to 17 is in the form of a continuous or endless member which is caused to assume a zigzag shape when on a tire T and is made up of a plurality of skid resisting members or parts 37 of firm and durable tread rubber each molded on or otherwise rigidly secured to two twisted steel wire cables 38, FIG. 17, that extend lengthwise through the members 37. Obviously a single cable or more than two cables can be embedded in members 27. Said members 37 are spaced apart on the cables 38 and a curved fitting 39 of non-flexible material is provided on the parts of the cables 38 between each two adjacent ends of the members 37. The curved fittings 39 are rigid with the cables 38 and form reverse bends at the two sides of the road contacting parts 37. Each curved fitting 39 at the outer side of the non-skid device has one of the perforated lugs 32 rigid with it and protruding from its convex side and the parts 35 and 36 which form the outside anchor loop or member pass through and are secured to these lugs 32.

The take-up means disclosed in FIGS. 10 to 16, used for tightening the non-skid device on a tire, also serves as the means for connecting cable part 36 of the outside anchor member with a lug 32 of one of the curved fittings 39 at the outer edge of the road engaging part of the non-skid device. This take-up means comprises two toggle members 40 and 41, connected together, end to end, by a pivot member 42 so they can be folded together like the parts of a hinge. Member 40 is connected by a pivot 43 with one of the lugs 32 at the outer edge of the road engaging part of the non-skid device. Member 41 has a transverse tube 44 rigidly secured to it near the end thereof remote from pivot 42 and the cable part 36 of the outer anchor member passes through said tube 44. When toggle parts 40 and 41 are unfolded as shown in FIGS. 10, 13 and 14 the outside anchor loop formed by parts 35 and 36 will be slack and application to or removal of the non-skid device from a tire will be facilitated. When toggle part 41 is moved from the extended position shown in FIGS. 10, 13 and 14 to the folded or closed position shown in FIGS. 11, 15 and 16 the cable part 36 will be stretched to the wide V shape shown in FIG. 11 and the non-skid device will be tightened on the tire. Also as the toggle member 41 is being moved toward the member 40 the leverage due to the toggle action will increase, thus facilitationg the tightening operation.

The toggle part 41 is locked in its closed position by a hook 45 which is secured by a plate 50 and nut 51 to one end of a bolt 46. Said bolt 46 is guided for longitudinal movement in lugs 47 on the side of said member 41 which is outermost when said member is folded. A compression spring 48 is interposed between one of the lugs 47 and a fixed collar 49 on the bolt 46 and yieldingly urges said bolt 46 in the proper direction to retract the hook 45. Said hook 45 is moved into an extended position by exerting pressure on a suitable head on the outer end of the bolt 46. When the hook is thus extended it can be engaged with an adjacent curved fitting 39 on the road engaging part of the non-skid device and the spring 48 will hold it so engaged until the hook 45 is again moved outwardly by exerting a pressure on outer end of bolt 46.

The application to and removal from a tire on a wheel of the nonskid device disclosed in FIGS. 1 to 9 and the device disclosed in FIGS. 9 to 17 is similar except that the device of FIGS. 1 to 9 is tightened and loosened on the tire by manipulation of the levers 25 but with the device of FIGS. 10 to 17 the tightening and loosening is done by manipulation of the parts 40 to 51. Both of these tightening devices provide increasing leverage as they are being moved toward a tightened position.

To apply the device of FIGS. 1 to 9 to a tire on a wheel without lifting the wheel clear of the surface on which it rests, the snap type fastener 21 is detached from eye member 22, the cable 20 is released from hook 29b and the tightening devices 25 released so as to allow for maximum slackness of all parts. It is then easy for a person at the outer side of the wheel to position the device on the tire so the inner parts thereof, including cable 20 will be in approximately the positions in which they are shown in FIG. 3. The inside anchor cable 20 is then engaged within the hook 29b and the fastener parts 21 and 22 snapped together by reaching back of the inner side of the wheel and the device is tightened on the tire by operating the tightening levers 25 from the outer side of the wheel and engaging the latch or hook members 25' on said levers with frame part 23.

The non-skid device can easily be removed from a wheel by releasing the tightening levers 25 from the outer side of the wheel, unfastening the parts 21, 22 and 29b which hold the inside anchor cable 20, pushing the device off of the wheel so it rests on the ground and moving the vehicle so the wheel is clear of the non-skid device.

The operation of the non-skid device shown in FIGS. 10 to 17 is similar to the just described operation except that the device of FIGS. 10 to 17 is tightened on a tire by moving toggle member 40 from its released position, FIGS. 10, 13 and 14 to its tightening position, FIGS. 11, 15 and 16, and engaging hook 45 with the adjacent fitting 39. It is loosened by releasing hook 45 and leaving toggle member 40 free to move to a released position.

We claim:

1. A non-skid device for a pneumatic tire on a vehicle wheel comprising an inner anchor member having two ends; readily detachable means connected with said two ends operable in securing said two ends together; an outer anchor member; said two anchor members being adapted to be positioned at the inner and outer sides of a tire respectively and each anchor member being capable of forming a closed loop of substantially smaller size than the tire; and a plurality of skid resisting members secured to and extending diagonally in zigzag fashion between said two anchor members back and forth across the tire, the inside anchor member being detachable from the skid resisting members at a location adjacent its two relatively attachable and detachable ends, whereby when said two detachable ends of said inside anchor member are detached from each other and the adjacent detachable connection with the skid resisting members is detached slackness and clearance are provided and the non-skid device is applicable to a tire on a wheel with the tire resting on the ground.

2. A non-skid device for application to a pneumatic tire on a vehicle wheel comprising a road engaging member of continuous length adapted, when on a tire, to extend back and forth diagonally in zigzag shape across the tread portion of the tire thereby forming reversely bent parts at opposite sides of the tire; a flexible inside anchor member adapted to be positioned at the inner side of the tire and having two separable ends; releasable means operable in detachably connecting said two separable ends with each other thereby providing a closed loop; an outside anchor member adapted to be positioned at the outer side of the tire and providing a closed loop; connector members operable in connecting the reversely bent parts at the outer side of said road engaging member with said inside anchor member, the connector member nearest one of the separable ends of said inside anchor member detachably holding said inside anchor member, whereby detachment of the two ends of said inside anchor member and detachment of said inside anchor member from said detachable connector member will provide slackness and clearance in said non-skid device for application of the same to a tire resting on a supporting surface.

3. The non-skid device as claimed in claim 2 in which slack take-up means operable in tightening the non-skid device on a tire is connected with one of said anchor members.

4. The non-skid device as claimed in claim 2 in which each connector member comprises a curved tubular part through which the road engaging part passes and a side lug to which one of the anchor members is secured when the non-skid device is operatively disposes on a tire.

5. The non-skid device as claimed in claim 2 in which the inside anchor member is slidably held by the connector member next adjacent to the connector member that detachable holds the inside anchor member.

6. The non-skid device as claimed in claim 2 in which take-up means operable in varying the circumferential length of said outer anchor member in tightening and loosening said non-skid device on a tire is operatively connected with said outer anchor member.

7. The non-skid device as claimed in claim 2 in which the outer anchor member is formed of two non-flexible frame parts having two pairs of adjoining ends and in which the two adjoining ends of each pair are connected with each other by lever means operable in varying the circumferential length of said outer anchor member.

8. The non-skid device as claimed in claim 2 in which the outside anchor member is a closed loop formed at least partly of a flexible cable and take-up means connecting said cable with one of the connector members at the adjacent outer edge of the road engaging member, said take-up means comprising two similar toggle members hinged together end to end for folding movement and having their outer ends connected respectively with said cable and said connector member; and means operable in locking said two toggle members in folded relation.

9. The non-skid device as claimed in claim 2 in which the zigzag road engaging part is an endless strip formed of at least one twisted steel wire cable serving as a core and having on it a plurality of road engaging skid resisting strips of tread rubber, said strips extending lengthwise of the cable and being longitudinally spaced apart, providing space between the adjacent ends of the strips for the connector members at the two edges of the road engaging part.

* * * * *